United States Patent [19]
Ramsey

[11] Patent Number: 5,584,636
[45] Date of Patent: Dec. 17, 1996

[54] BALE HANDLING APPARATUS

[75] Inventor: John Ramsey, Bakersfield, Calif.

[73] Assignee: Calcot, Ltd., Bakersfield, Calif.

[21] Appl. No.: 378,706

[22] Filed: Jan. 26, 1995

[51] Int. Cl.$^6$ .................................................. A01D 90/02
[52] U.S. Cl. ......................... 414/24.5; 414/721; 414/731
[58] Field of Search ................... 414/24.5, 24.6, 414/744.1, 744.2, 744.3, 607, 911, 920, 703–721, 684–731; 294/61, 120, 86.41

[56] References Cited

U.S. PATENT DOCUMENTS

| | | | |
|---|---|---|---|
| 2,613,831 | 10/1952 | Rees | 414/731 |
| 2,887,092 | 5/1959 | Brady | 414/607 |
| 3,133,655 | 5/1964 | Gardner | 214/652 |
| 3,934,726 | 1/1976 | Martin | 214/131 A |
| 4,120,405 | 10/1978 | Jones et al. | 414/24.5 |
| 4,264,252 | 4/1981 | Jennings et al. | 414/24.5 |
| 4,597,703 | 7/1986 | Bartolini | 414/24.6 |
| 4,648,769 | 3/1987 | Stirling | 294/61 |
| 4,674,786 | 6/1987 | Lynch | 294/120 |
| 4,897,010 | 1/1990 | Golley | 414/24.6 |
| 4,911,596 | 3/1990 | Fetter | 414/24.5 |
| 5,082,413 | 1/1992 | Grosz et al. | 414/731 |
| 5,129,775 | 7/1992 | Coats et al. | 414/24.5 |
| 5,178,505 | 1/1993 | Smith | 414/24.5 |

*Primary Examiner*—Karen Merritt
*Assistant Examiner*—Douglas Hess
*Attorney, Agent, or Firm*—Townsend And Townsend And Crew LLP

[57] ABSTRACT

A break-out attachment (2) configured for connection to a vehicle, such as a lift truck (20), for retrieving, transporting and releasing cotton bales. The break-out attachment comprises a shaft (24) rotatably mounted to a base frame (4), two lower horizontally spaced support arms (10, 12) extending outward from the shaft for supporting a cotton bale and an upper arm (6) extending from the shaft between the support arms for engaging the cotton bale. A rotary actuator (52) is coupled to the shaft for rotating the shaft and the three arms around the longitudinal axis of the shaft. The upper arm has a hydraulic cylinder (88) for telescoping toward and away from the shaft. The hydraulic cylinder provides more flexibility in the positioning of the truck and allows the operator to initially engage the cotton bale with only the upper arm, thus facilitating the process of retrieving the bale.

18 Claims, 4 Drawing Sheets

BALE HANDLING APPARATUS

BACKGROUND OF THE INVENTION

This invention relates to bale handling devices generally, and more specifically to a break-out attachment on a lift truck for retrieving, transporting and releasing cotton bales.

Upon harvesting a cotton crop, the cotton is typically formed in round or rectangular bales for storage and transportation. Because of the relatively large size and heavy weight of these cotton bales, commercial manufacturers require a bale handling device that can be attached to the front of a vehicle, such as a tractor or lift truck, to lift and move these large heavy bales. One such device, often referred to as a break-out attachment, comprises an upper hook arm for engaging one of the wires wrapped around the cotton bale and two lower support arms for supporting and controlling the bale. The arms are typically attached to a shaft or frame, which is rotatably coupled to the front of the lift truck. The driver of the truck moves the break-out attachment into position to engage a cotton bale with the upper hook and lower support arms and then elevates the break-out attachment to lift the bale.

One drawback with existing break-out attachments is that the arms are generally fixed with respect to the shaft or frame. The driver of the lift truck must therefore maneuver the vehicle precisely into position relative to the cotton bale. This increases the amount of time required to retrieve each cotton bale and subjects the lift truck to potential damage from adjacent rows of bales. In addition, to engage the cotton bale, the driver must properly align all three arms with the bale. Otherwise, the bale may not be properly supported when it is lifted by the truck or one of the arms of the break-out attachment may get caught on an adjacent bale, possibly damaging either the arm or the bale.

Another drawback with existing break-out attachments is that they are generally constructed of a light duty frame and are not extremely durable. Because of the large size and weight of the cotton bales, break-out attachments undergo tremendous structural loads which often damage portions of the break-out attachment, causing the need for repair or replacement of the damaged portions or the entire break-out attachment. The maintenance costs of these devices, therefore, are extremely high. In addition, break-out attachments include moving components that are subject to excessive wear or jamming. For example, these devices typically include a shaft mounted to the base frame for rotating the upper and lower support arms about the vertical axis of the shaft. The shaft is rotatably supported by bearings or bushings and driven by some type of rotary actuator. These components (the bearings or bushings and the actuator), however, are generally exposed to abrasive dirt, dust and pieces of cotton that fly around the break-out attachment during handling of the cotton bale. The dirt and dust become lodged between these parts eventually subjecting them to excessive wear and possible jamming.

What is needed, therefore, is an improved bale handling apparatus for handling cotton bales. The apparatus should be configured to provide more flexibility in the positioning of the lift truck relative to the cotton bale to diminish the potential of damaging the truck and to decrease the time required to retrieve or release the bale. In addition, the apparatus should be durable to resist large and sudden structural loads during operation and it should have means for shielding any moving parts from dirt, dust and/or cotton pieces.

SUMMARY OF THE INVENTION

The present invention is directed to a bale handling apparatus, such as a break-out attachment, for lifting, transporting and releasing cotton bales. The break-out attachment comprises a shaft mounted to a base frame, which can be connected to a vehicle, such as a lift truck. Two lower, horizontally spaced, support arms extend outward from the shaft for supporting and controlling a cotton bale and an upper arm extends from the shaft between and above the lower support arms for engaging the cotton bale. A rotary actuator is coupled to the shaft for rotating the shaft and the three arms around the longitudinal axis of the shaft. The upper arm has a telescopic end portion and a linear actuator for moving the end portion toward and away from the shaft. The telescopic upper arm provides more flexibility in the positioning of the truck and allows the operator to initially engage the cotton bale with only the upper arm, thus facilitating the process of retrieving the bale.

In a preferred configuration, the upper arm includes a hydraulic cylinder disposed within an outer sheath and the linear actuator is a hydraulic valve. The valve has input and output hoses coupled to a chamber within the hydraulic cylinder for delivering and withdrawing fluid into the chamber from a source of fluid within the truck. A hook is removably attached to the distal end of the hydraulic cylinder for engaging the wires that bind the cotton within the bale. The hook is preferably removable so that it can be easily replaced if it is damaged or destroyed without having to replace the hydraulic cylinder or the entire upper arm.

To provide support against the large structural loads typically encountered with heavy cotton bales, the upper and lower support arms are preferably fixed to a heavy duty mounting arm, which is coupled to the shaft such that the upper arm is generally perpendicular to the shaft. In addition, the shaft is rotatably mounted to the base frame by a large bearing and coupled to the rotary actuator by a chain coupling. The bearing is preferably sealed within a housing to prevent dirt, dust and cotton from becoming lodged between the bearing and the shaft, thereby minimizing wear and problems with jamming.

The above is a brief description of some deficiencies in the prior art and advantages of the present invention. Other features, advantages and embodiments of the invention will be apparent to those skilled in the art from the following description, accompanying drawings and appended claims.

DESCRIPTION OF THE PREFERRED EMBODIMENT

Figure 1:
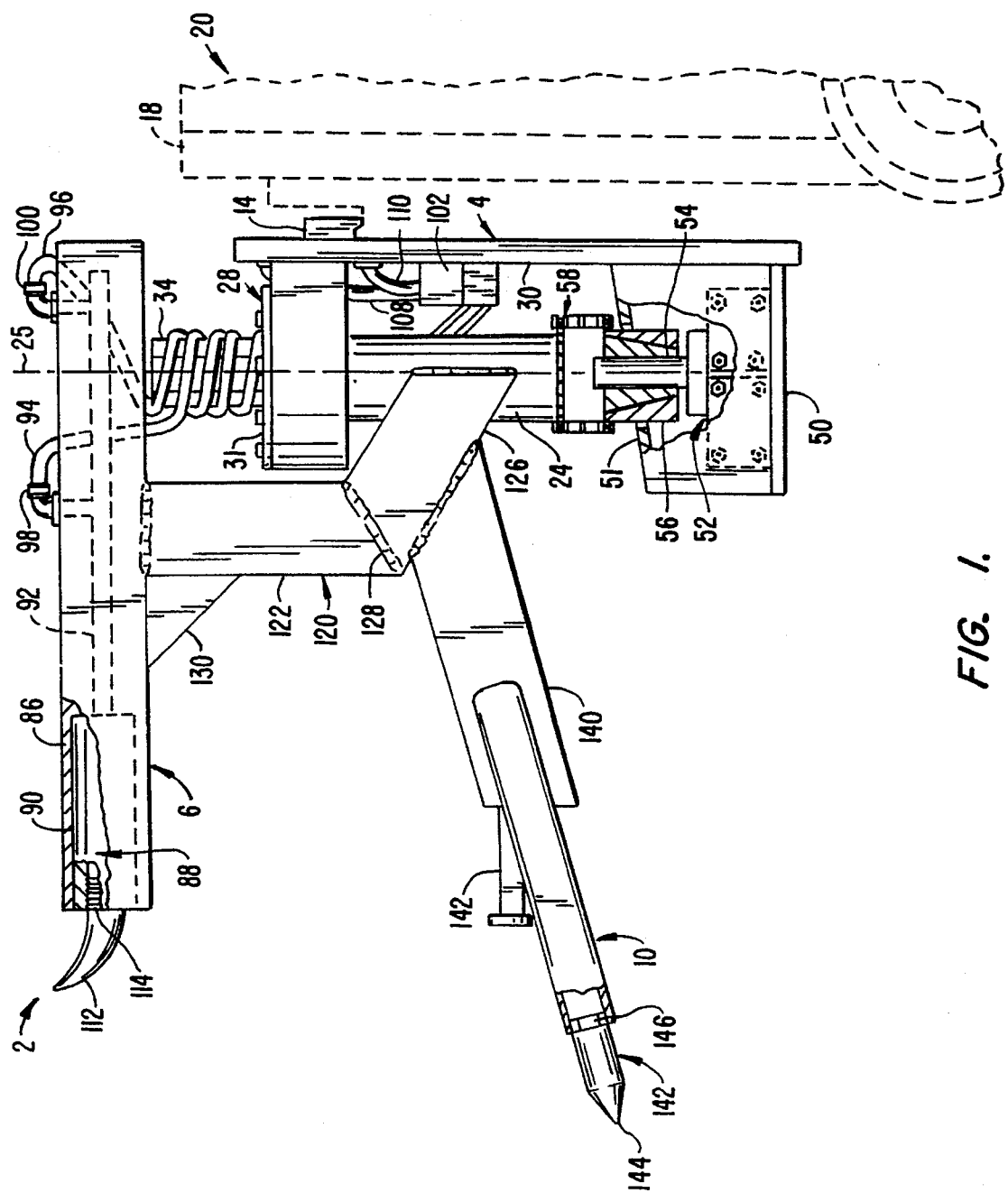
FIG. 1 is a side view of a break-out attachment according to the present invention illustrating a telescopic hook arm in a retracted position.

Referring to the drawings in detail, wherein like numerals indicate like elements, a break-out attachment 2 is illustrated according to the principals of the invention. Break-out attachment 2 generally comprises a body or base frame 4 fixed to an upper arm 6 for engaging a load, such as a cotton bale, and first and second lower arms 10, 12 for supporting and controlling the cotton bale when it is handled and transported.

Figure 2:
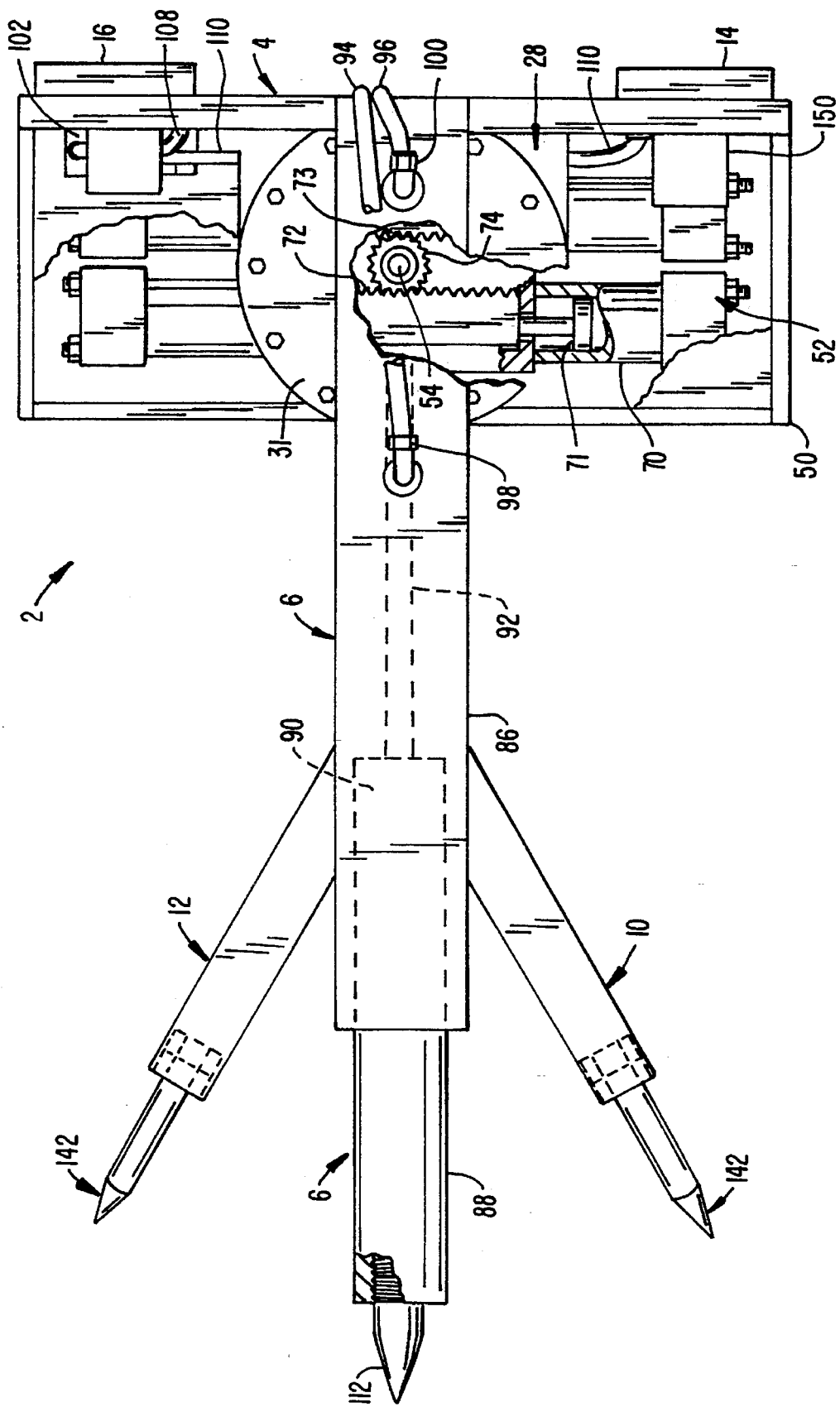
FIG. 2 is a top view of the break-out attachment of FIG. 1 illustrating the telescopic hook arm in a partially extended position.

As shown in FIGS. 1 and 2, base frame 4 includes a pair of mounting brackets 14, 16 for attaching break-out attachment 2 to the mast or carriage 18 of a lift truck 20, as is conventional in the art. Preferably, lift truck 20 is a conventional forklift capable of lifting and/or tilting break-out attachment 2 and controlling the linear and rotary actuators within break-out attachment 2 (discussed below). It should be understood, however, that although break-out attachment 2 is shown and described in a particular configuration attached to a particular lift truck, it is not intended to be limited in that manner. That is, break-out attachment 2 can be used with other lift trucks and with other devices, such as a three point hitch for a farm tractor, for example.

Figure 3:
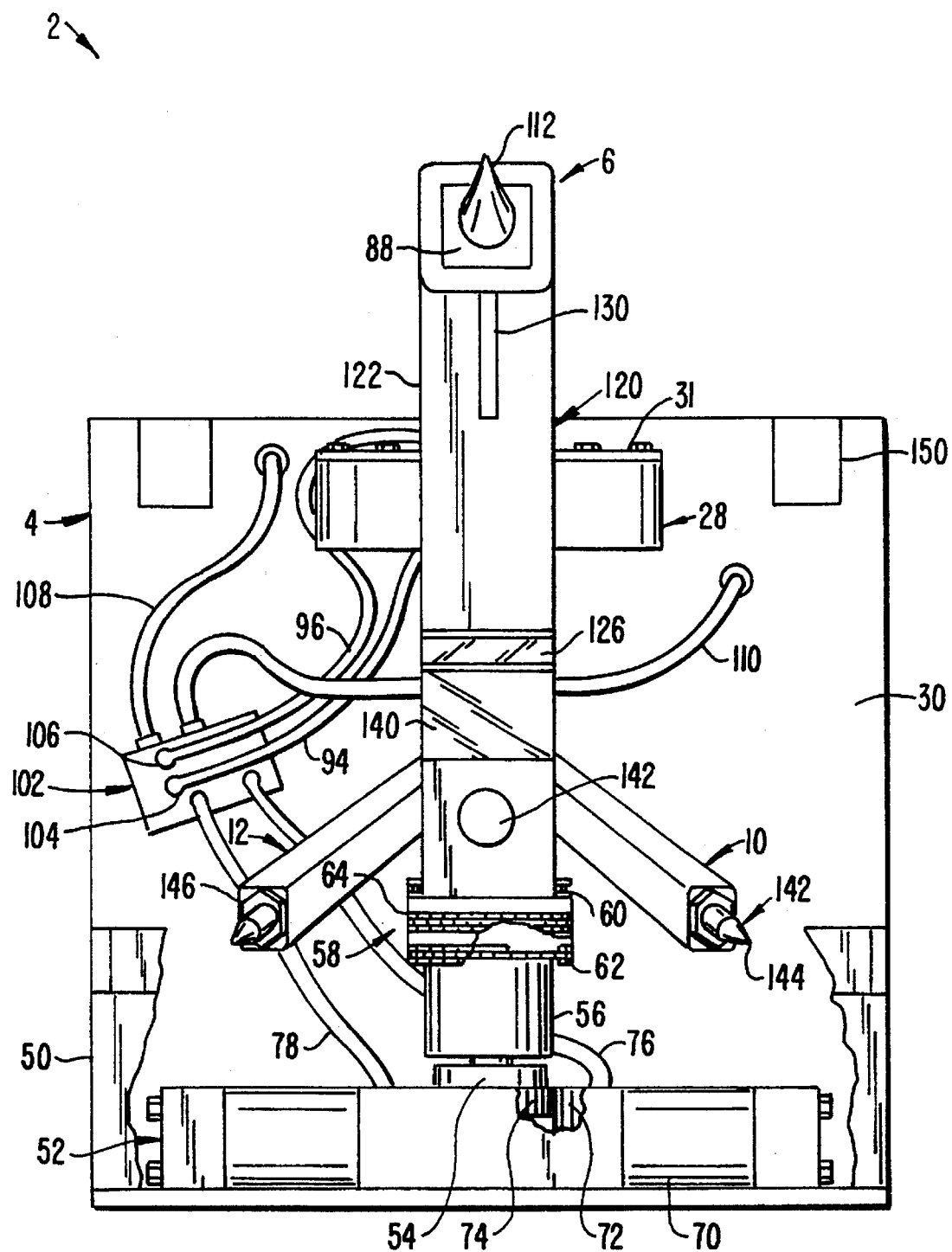
FIG. 3 is a front view of the break-out attachment of FIG. 1.

Referring to FIGS. 1 and 3, break-out attachment 2 further includes a main shaft 24 that is rotatably mounted to base frame 4 by an annular bearing 26. Shaft 24 is preferably a hollow tube having a relatively thick metal wall, preferably about ½ to 2 inches thick, to increase its durability. Shaft 24 has a longitudinal axis 25 that is vertical when base frame 4 is suitably attached to lift truck 20. Bearing 26 is preferably a roller bearing housed within a bearing housing 28, which is mounted to a side 30 of base frame 4 opposite mounting brackets 14, 16. Bearing housing 28 includes an upper plate 31 surrounding a nut 32 for threadably securing shaft 24 to housing 28 (see FIG. 4). A hollow tube extension 34 of shaft 24 extends above upper plate 31 to protect nut 32 from exposure to dirt, dust, cotton, etc.

Figure 4:
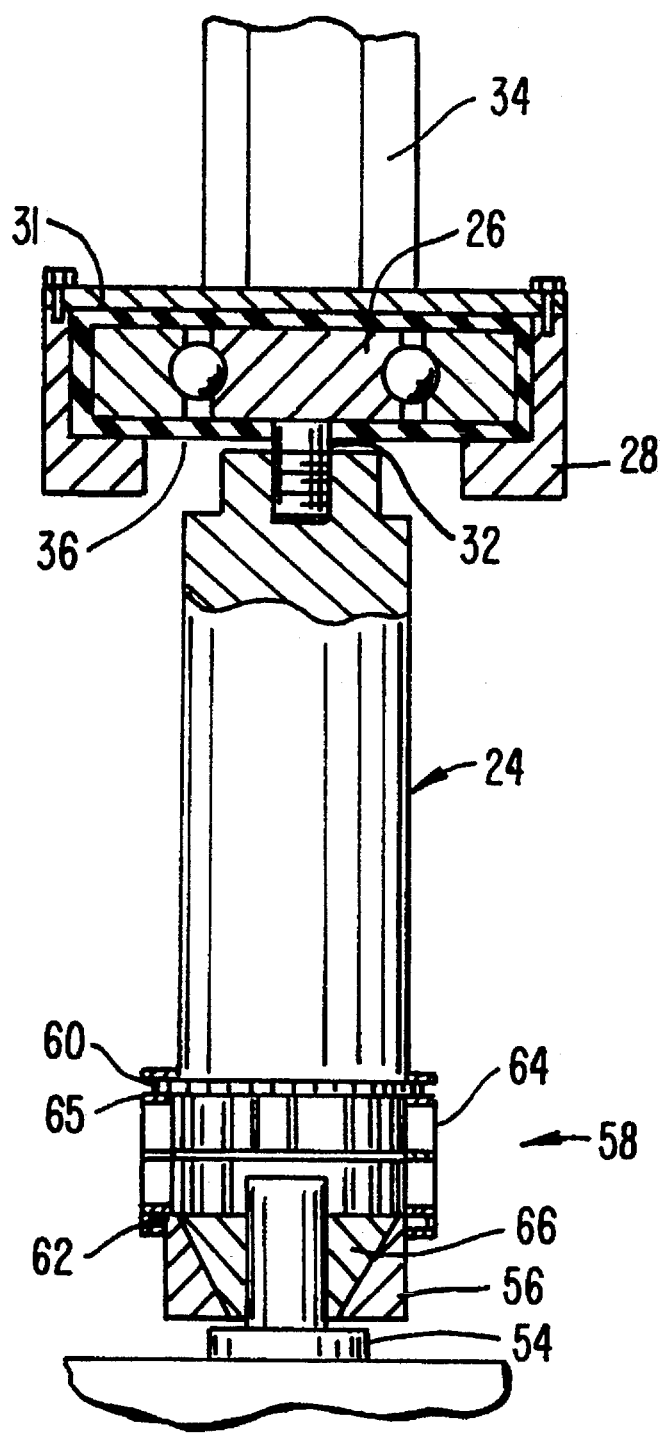
FIG. 4 is a partial cross-section of a main shaft of the break-out attachment of FIG. 1.

As shown in FIG. 4, bearing housing 28 further includes a seal 36 around bearing 26 to limit the wear on bearing 26 and to protect the bearing from exposure so that main shaft 24 will rotate freely. In a preferred configuration, bearing 26 is extremely large, having an outer radius of about 6 to 10 inches to increase its resistance to large structural loads. Of course, the invention is not limited to this configuration and those skilled in the art will readily recognize that other devices may be used to rotatably support the shaft (e.g., a bushing).

Break-out attachment 2 further includes an actuator housing 50 mounted to side 30 near the bottom of base frame 4, as shown in FIG. 1. A rotary actuator 52 is contained within actuator housing 50 for rotating main shaft 24 about its longitudinal axis 25. Actuator housing 50 has an opening 51 for receiving the lower portion of main shaft 24 and is preferably constructed of metal, such as steel, to protect rotary actuator 52 from damage and exposure to dirt, oil, cotton, etc. Rotary actuator 52 includes an output shaft 54 that is coupled to main shaft 24 by a linkage 56 and a chain coupling 58. Preferably, chain coupling 58 comprises compact double-roll chains that can transfer a large amount of horsepower to main shaft 24. Chain coupling 58 comprises a top sprocket 60 coupled to main shaft 24 and a bottom sprocket 62 coupled to linkage 56, which preferably comprises a tapered bushing 66, as shown in FIG. 4. Two chains 64, 65 transmit the rotary motion of output shaft 54 to main shaft 24. This configuration provides flexibility in case of a misalignment between output shaft 54 and main shaft 24.

As best shown in FIG. 2, rotary actuator 52 is preferably a hydraulic rack and pinion rotary actuator such as that commercially available at Parker-Hanathon under the brand name "HTR45". However, other brands may be used such as "TRW" "Rotomation", "Tomcat", or "Ohio Oscillator" and other types of rotary actuators may be used such as a helix style with a captured piston or single or double sided vane actuators. Rotary actuator 52 comprises a plurality of generally parallel cylinders 70 and a plurality of pistons 71 disposed within cylinders 70 for reciprocal movement therein. Preferably, there are two pairs of cylinders on opposite side of actuator 52. Each pair of cylinders is cross-connected to a rack 72, 73 in the center of actuator 52, as is conventional in the art. The racks 72, 73 are disposed on either side of a double-sided pinion 74 and have teeth meshing with the teeth of pinion 74 for converting the linear movement of pistons 71 into rotation of pinion 74. Providing two racks 72, 73 on either side of pinion 74 prevents side loading of pinion 74.

Pinion 74 is conventionally coupled around output shaft 54 for rotating the output shaft. As shown in FIG. 3, hydraulic input and output lines 76, 78 are connected to actuator 52 so that lines 76, 78 are in fluid communication with the chambers within cylinders 70. Preferably, actuator 52 includes conventional adapters for directing the fluid from lines 76, 78 to and from the appropriate cylinders 70. Lines 76, 78 are coupled to a diverter valve 102 mounted to base 4 for connection to a pump (not shown) and a source of fluid, such as oil or gas, within lift truck 20 via lines 108, 110 (discussed in more detail below). Rotary actuator 52 can rotate main shaft 24 at least 180°. Of course, it will be understood that other actuators or mechanisms for rotating main shaft 24 can be used in conjunction with the present such as a linear actuator.

As shown in FIG. 1, upper arm 6 is attached to shaft 24 by a mounting arm 120 so that arm 6 is oriented transversely to the longitudinal axis 25 of main shaft 24. Preferably, upper arm 6 is perpendicular to axis 25 so that arm 6 will be generally horizontal when frame 4 is attached to carriage 18 of lift truck 20. Mounting arm 120 is preferably a heavy duty square metal tube comprising a vertical portion 122 welded to the lower surface of upper arm 6 and an inclined portion 126 welded to vertical portion 122 at a joint 128. Cotton bales can create a strong moment arm on the outer portion of upper arm 6, particularly when the arm is telescoped away from shaft 24 (discussed in greater detail below). To help support upper arm 6, a gusset plate 130 is attached to vertical portion 122 of mounting arm 120. Of course, the invention is not limited to the above configuration for mounting upper arm 6 onto shaft 24 and a variety of other methods may be used, such as mounting upper arm 6 directly to shaft 24.

Upper arm 6 comprises an outer sheath 86, preferably a metal square tube, and a hydraulic cylinder 88 that can telescope with respect to outer sheath 86 in a direction parallel to the longitudinal axis of arm 6. Preferably, outer sheath 86 has a wall thickness in the range of about ¼ to 1 inch. Outer sheath 86 defines a chamber 90 in fluid communication with a fluid passage 92 (see FIG. 2). Hydraulic cylinder 88 is disposed within chamber 90 for reciprocation therein in a linear direction when fluid is moved into and out of fluid passage 92, as is conventional in the art. Input and output hydraulic hoses 94, 96 are fluidly coupled to passage 92 by adapters 98, 100, which are preferably 90° fittings threadably coupled to inner threads within sheath 86. Input hose 94 supplies fluid, such as oil, water or other suitable fluid, into fluid passage 92 and output hose 94 withdraws fluid from passage 92 to withdraw cylinder 88 back into chamber 90.

As shown in FIG. 3, input and output hoses 94, 96 are fluidly coupled to diverter valve 102 by conventional adapters 104, 106, respectively. Diverter valve 102 is mounted to side 30 of base frame 4 and has fluid lines 108, 110 for connection to a pump and a source of fluid in lift truck 20.

Preferably, diverter valve 102 is actuated by controls in the lift truck, e.g., a foot pedal, to switch between hoses 94, 96 to hydraulic cylinder 88 and lines 76, 78 to rotary actuator 52. In this manner, the operator of lift truck 20 can actuate diverter valve 102 to either rotate main shaft 24 about its axis 25 or to telescope hydraulic cylinder 88 of upper arm 6 toward and away from base frame 4, thereby providing flexibility in the positioning of lift truck 20 with respect to the cotton bale. Of course, it will be apparent to those skilled in the art that upper arm 6 may be telescoped by other means, such as electrical or magnetic actuators or by direct mechanical actuation from the lift truck.

Referring again to FIG. 1, upper arm 6 further includes a hook 112 threadably coupled to inner threads 114 on the distal end of hydraulic cylinder 88. Hook 112 is adapted to engage the wires that typically hold the cotton together in a cotton bale to secure upper arm 6 to the bale. Hook 112 is preferably a bolt, such as a 1¼ inch SAE GRADE 8 bolt, that is removably attached to hydraulic cylinder 88 so that when the bolt is damaged or ripped off by a cotton bale, it can be replaced without having to replace hydraulic cylinder 88 or the entire upper arm 6.

As shown in FIGS. 1 and 3, first and second lower arms 10, 12 are coupled to a shank 140, which is welded to inclined portion 126 of mounting arm 120 to provide support for lower arms 10, 12. Lower arms 10, 12 are preferably metal square tubes having a thickness of about ¼ to 1 inch. Lower arms 10, 12 are connected to either side of shank 140 so that lower arms 10, 12 extend away from each other to form an angle therebetween. Preferably, this angle is about 45 to 90° and more preferably about 55°–65°. In this manner, lower arms 10, 12 will effectively support and control the cotton bale when it is attached to hook 112 on upper arm 6. In a preferred configuration, inclined portion 126 of mounting arm 120 is configured so that shank 140 and lower arms 10, 12 extend at an angle of about 5 to 25 degrees, and more preferably an angle of about 10 to 20 degrees, with respect to a plane perpendicular to the longitudinal axis of shaft 24 (i.e., the horizontal plane when the apparatus is attached to lift truck 20). This configuration facilitates the placement of the cotton bale onto lower arms 10, 12.

As shown in FIGS. 1 and 3, a stop pin 142 protrudes outward from shank 140 to stop the cotton bale from contacting the rest of break-out attachment 2 when upper arm 6 telescopes back towards shaft 24, as discussed below. Lower arms 10, 12 each include a removable end portion 142 having a pointed tip 144 for penetrating through the cotton bale. In a preferred configuration, end portions 142 are bolts threadably coupled to lower arms 10, 12 by lock nuts 146 fixed to the inner surface of lower arms 10, 12. The distance that pointed tips 144 extend from the distal end of lower arms 10, 12 can be adjusted by rotating end portions 142 within lock nuts 146. This configuration allows the user to adjust the distance that lower arms 10, 12 will extend out from stop pin 142 depending on the amount of support required to hold the cotton bale. In addition, the removable end portions 142 can easily be replaced if they are damaged; rather than replacing the entire lower support arm.

In use, the driver of lift truck 4 positions break-out attachment 2 next to a suitable cotton bale. If necessary, shaft 24 and arms 6, 10, 12 are rotated into position by controlling fluid flow to and from rotary actuator 52, as discussed above. Stop blocks 150 are attached to side 30 of base frame 4 to prevent overrotation of shaft 24 and possible damage to break-out attachment 2. To telescope upper arm 6 into the cotton bale, the driver actuates diverter valve 102 and pumps fluid through input hose 94 into passage 92 so that hydraulic cylinder 88 is driven outward and hook 112 penetrates the cotton bale. At a suitable point, the user closes diverter valve 102 and lifts carriage 18, thereby lifting the entire break-out attachment 2. Hook 112 engages one of the wires in the cotton bale to lift the bale into the air. The user then withdraws the fluid from passage 92 through output hose 96 so that hydraulic cylinder 88 is withdrawn, thereby pulling the cotton bale towards apparatus 2 and onto lower support arms 10, 12 for movement to other locations. The cotton bale can be released by reversing the above process.

Other modifications and variations can be made to disclose embodiments without departing from the subject invention as defined in the following claims. For example, support arms 10, 12 can extend generally perpendicular to shaft 24, rather than at the inclined angle shown in the figures. Alternatively, the apparatus could include an actuator for pivoting shank 140 so that the angle can be chosen by the driver, if desired. In addition, base frame 4 may be altered so that the apparatus can be attached to other vehicles, such as a three-point hitch on a tractor.

What is claimed is:

1. A bale handling apparatus comprising:

a shaft having a longitudinal axis;

a rotary actuator, coupled to said shaft, for rotating said shaft around the longitudinal axis;

first and second horizontally spaced lower support arms extending from said shaft and coupled to said shaft for rotation therewith, said lower support arms extending away from each other to define an acute angle therebetween; and an upper arm extending from said shaft between said lower support arms and vertically spaced from said lower support arms, said upper arm coupled to said shaft for rotation therewith and having an end portion opposite said shaft, said end portion being telescopically displaceable with respect to said shaft, said lower support arms being inclined away from said upper arm.

2. The apparatus of claim 1 further including a linear actuator coupled to said upper arm for telescoping said end portion toward and away from said shaft.

3. The apparatus of claim 2 wherein said linear actuator is a hydraulic actuator having first and second hydraulic tubes connected to said upper arm for delivering and withdrawing fluid into said upper arm.

4. The apparatus of claim 3 wherein said end portion is an outer telescopic member and said upper arm further comprises an inner telescopic member in fluid communication with said hydraulic tubes for telescoping said outer telescopic member in a generally perpendicular direction to the longitudinal axis of said shaft.

5. The apparatus of claim 1 further including a base frame adapted for connection to a lift truck, said base frame including a bearing for rotatably supporting said shaft.

6. The apparatus of claim 5 further including a bearing housing mounted to said base frame, said bearing housing including means for sealing said bearing within said housing.

7. The apparatus of claim 5 wherein said rotary actuator is a hydraulic rack and pinion actuator enclosed within an actuator housing to shield said hydraulic rack and pinion actuator, said housing being mounted to said base frame beneath said shaft.

8. The apparatus of claim 7 wherein said hydraulic rack and pinion actuator includes an output shaft, the apparatus further including a chain coupling for transmitting rotary motion of said output shaft to said shaft.

9. A bale handling apparatus comprising:

a shaft having a longitudinal axis;

a rotary actuator, coupled to said shaft, for rotating said shaft around the longitudinal axis;

first and second horizontally spaced lower support arms extending from said shaft and coupled to said shaft for rotation therewith, said lower support arms extending away from each other to define an angle therebetween;

an upper arm extending from said shaft between said lower support arms and vertically spaced from said lower support arms, said upper arm coupled to said shaft for rotation therewith and having an end portion opposite said shaft, said end portion being telescopically displaceable with respect to said shaft, said lower support arms being inclined away from said upper arm and a hook removably coupled to a distal end of said end portion for engaging a bale.

10. A bale handling apparatus comprising:

a shaft having a longitudinal axis;

a rotary actuator, coupled to said shaft, for rotating said shaft around the longitudinal axis;

first and second horizontally spaced lower support arms extending from said shaft and coupled to said shaft for rotation therewith;

an upper arm extending from said shaft between said lower support arms and vertically spaced from said lower support arms, said upper arm coupled to said shaft for rotation therewith and having an end portion opposite said shaft, said end portion being telescopically displaceable with respect to said shaft; and first and second bolts removably coupled to said first and second lower support arms, respectively, said bolts each having a distal tip for penetrating a bale, and said bolts are threadably coupled to said lower support arms such that a distance said distal tips extend from said lower support arms can be adjusted.

11. An apparatus attachable to a lift truck for handling a cotton bale comprising:

a shaft having a longitudinal axis;

means, coupled to said shaft, for rotating said shaft about said longitudinal axis;

first and second lower arms for supporting the cotton bale, said lower arms extending from said shaft and coupled to said shaft for rotation therewith;

an upper arm extending from said shaft between said lower support arms and vertically spaced from said lower support arms, said upper arm coupled to said shaft for rotation therewith and including means for engaging the cotton bale, said engaging means being movable between a first position, where said engaging means is disposed close to said shaft, and a second position, where said engaging means is disposed farther away from said shaft; and means, coupled to said upper arm, for moving said engaging means between the first and second positions.

12. The apparatus of claim 11 wherein said engaging means includes a hook sized to engage a portion of the cotton bale.

13. The apparatus of claim 12 further including a hydraulic cylinder within said upper arm and removably coupled to said hook, said moving means comprising a hydraulic actuator coupled to said hydraulic cylinder for telescoping said hydraulic cylinder and said hook between the first and second positions.

14. The apparatus of claim 11 wherein said rotating means comprises a rotary actuator coupled to said shaft.

15. A method for handling a cotton bale comprising the steps of:

providing a shaft fixed to a lift truck and having an upper arm and first and second lower support arms extending outward therefrom;

positioning said upper and lower arms adjacent the cotton bale;

telescoping at least a portion of said upper arm away from said lift truck such that said portion of said upper arm engages the cotton bale;

vertically lifting said shaft such that said portion of said upper arm lifts the cotton bale; and telescoping said portion of said upper arm back towards the lift truck such that the cotton bale rests on said lower support arms.

16. The method of claim 15 further comprising delivering fluid into said upper arm and displacing said portion of said upper arm with said fluid.

17. The method of claim 15 further comprising withdrawing fluid from said upper arm such that said portion of said upper arm is drawn back towards the lift truck.

18. The method of claim 15 further including rotating said upper and lower arms about a generally vertical axis to align said upper and lower arms with cotton bale.

* * * * *